(12) United States Patent (10) Patent No.: US 8,806,187 B1
Vemula et al. (45) Date of Patent: Aug. 12, 2014

(54) PROTECTING BROWSER-VIEWED CONTENT FROM PIRACY

(75) Inventors: Gopal Venu Vemula, San Jose, CA (US); Brad Hasegawa, San Francisco, CA (US)

(73) Assignee: Google Inc., Mountain View, CA (US)

( * ) Notice: Subject to any disclaimer, the term of this patent is extended or adjusted under 35 U.S.C. 154(b) by 847 days.

(21) Appl. No.: 12/958,331

(22) Filed: Dec. 1, 2010

Related U.S. Application Data

(60) Provisional application No. 61/266,367, filed on Dec. 3, 2009.

(51) Int. Cl.
*G06F 21/00* (2013.01)
*H04L 29/06* (2006.01)

(52) U.S. Cl.
USPC .......................................................... 713/150

(58) Field of Classification Search
USPC .......................................................... 713/150
See application file for complete search history.

(56) References Cited

U.S. PATENT DOCUMENTS

| | | | | |
|---|---|---|---|---|
| 5,930,361 A | * | 7/1999 | Hayashi et al. | 380/210 |
| 7,493,499 B1 | * | 2/2009 | Deaver et al. | 713/193 |
| 8,438,402 B2 | * | 5/2013 | Matsushima et al. | 713/189 |
| 2007/0256061 A1 | * | 11/2007 | Victorov | 717/141 |
| 2008/0080718 A1 | * | 4/2008 | Meijer et al. | 380/282 |

FOREIGN PATENT DOCUMENTS

WO    WO 2009/119049    * 10/2009

OTHER PUBLICATIONS

Zdrnja, B., "Advanced JavaScript obfuscation (or why signature scanning is a failure)," ISC Diary, Apr. 7, 2009, 3 pages, [online][retrieved on Jun. 22, 2011] Retrieved from the internet <URL:http://isc.sans.org/diary.html?storyid=6142>.

* cited by examiner

*Primary Examiner* — Lisa Lewis
(74) *Attorney, Agent, or Firm* — Fenwick & West LLP

(57) ABSTRACT

A content server provides a browser of a client with encrypted content and with obfuscated browser-executable code for decrypting and displaying the content within the browser. Both the encrypted content and the obfuscated browser-executable code are generated based at least in part on an identity of the user requesting the content, and thus are different from encrypted content and obfuscated browser-executable code provided to other users. Further, in one embodiment the browser-executable code provided by the server changes periodically, such as weekly, thereby rendering ineffective any malicious software tools that obtain decrypted content by calling expected functions of the code. In one embodiment, the obfuscated browser-executable code for a user is precomputed before that user makes a request for content.

21 Claims, 4 Drawing Sheets

PROTECTING BROWSER-VIEWED CONTENT FROM PIRACY

CROSS REFERENCE TO RELATED APPLICATIONS

The application claims the benefit of Provisional Application No. 61/266,367, filed on Dec. 3, 2009, which is hereby incorporated herein by reference.

BACKGROUND

1. Field of Art

The disclosure generally relates to protection of digital content, and in particular to securing access to digital content viewed within a web browser.

2. Background of the Invention

More and more content, such as printed documents (e.g., books, magazines, and newsletters), video, audio, and the like is being made available in digital form. One form of digital distribution being increasingly employed—hereinafter referred to as web-based viewing—involves a content server providing portions of the content to a client device, with the client viewing the provided content within a web browser, rather than locally storing an entire file representing the content and viewing it within a dedicated local application. This form of digital distribution has the advantage of allowing a user to access content from any client device having a web browser, rather than being limited to a client device on which the content has been locally stored.

However, regardless of the particular form of digital distribution that is employed, the ease with which digital content can be copied and disseminated over computer networks can be problematic for the producers of the content, who do not wish for the content to be distributed without their consent and control. For example, publishers of digital content such as books may wish to make the content available for viewing contingent on a prior purchase, and consequently wish to avoid allowing the content to become readily available to those who have not purchased it. Without the ability to prevent widescale automated duplication of the content, such publishers are often hesitant to allow their content to be made electronically available in the first place. One conventional approach to the problem of electronic copying is traditional digital rights management. However, such an approach requires writing software that includes hardware and/or operating system-specific code, which is not easily portable to different types of client devices, and further requires the local installation of software on each client device, rather than permitting viewing through a browser already installed on the client device.

Web-based viewing of digital content does not involve downloading a single, easily-duplicatable file containing the content, but rather relies on the browser to request and display the content in units, such as individual pages of a printed publication. However, it is possible for one with sufficient technical knowledge to create a downloading application that employs the same application programming interface (API) as the browser to request the content. Such a downloading application can then request each unit of content from the server using the browser API and assemble the resulting content into a single unencrypted file, which may then be freely disseminated, without the consent or control of the content producer. Currently, there are no effective mechanisms to prevent such downloading of content made available for web-based viewing.

SUMMARY

The difficulties described above are addressed by a method, computer, and computer program product that encrypt content in a user-specific manner and provide decryption capability via separate browser-executable code, the interface of which is varied periodically at a content server. More specifically, the content server provides a browser of a client with encrypted content and with obfuscated browser-executable code for decrypting and displaying the content within the browser. Both the encrypted content and the obfuscated browser-executable code are generated based at least in part on an identity of the user requesting the content, and thus are different from encrypted content and obfuscated browser-executable code provided to other users. Further, in one embodiment the browser-executable code provided by the server changes periodically, such as weekly, thereby rendering ineffective any malicious software tools that obtain decrypted content by calling expected functions of the code. In one embodiment, the obfuscated browser-executable code for a user is pre-computed before that user makes a request for content.

In one embodiment, a computer-implemented method of preventing unauthorized redistribution of content provided to a browser of a client device comprises receiving a request for content from a user, the request including an identifier of the user. The method further comprises generating an obfuscated version of browser-executable code stored in a code repository, the generating of the obfuscated version based at least in part on the identifier, the obfuscated version being functionally equivalent to the browser-executable code, and encrypting the content based at least in part on the identifier. The method additionally comprises providing the obfuscated version of the browser-executable code and the encrypted content to a browser of a client device. The browser-executable code, when executed in the browser, causes decryption of the content and display of the content within the browser.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
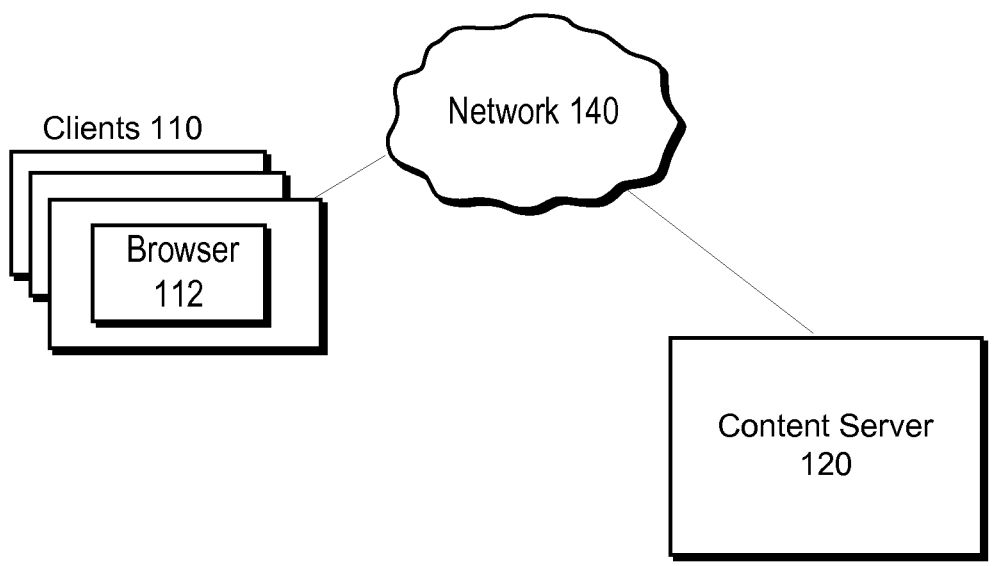
FIG. 1 is a high-level block diagram of a computing environment, according to one embodiment.

FIG. 1 is a high-level block diagram of a computing environment 100 according to one embodiment. FIG. 1 illustrates clients 110 and a content server 120 connected by a network 140. Only one content server 120 is shown in FIG. 1 in order to simplify and clarify the description. Embodiments of the computing environment 100 can have thousands or millions of clients 110 and/or content servers 120 connected to the network 140.

In general, a client 110 presents digital content to a user, such as displaying pages of a digital book, or playing audio or video. More specifically, the digital content is stored on the content server 120, and the client 110 communicates with the content server to obtain both the content (in encrypted form) and the code required to decrypt and present it to the user within a browser 112. Both the content and the code are modified from their original forms according to the identity of the particular user.

A client 110 is a computer, such as a personal computer, laptop computer, personal digital assistant, mobile phone, or more generally any device connected to the network 140. The client 110 executes a web browser 112 such as MICROSOFT INTERNET EXPLORER, MOZILLA FIREFOX, or GOOGLE CHROME that allows the user to retrieve and be presented with content from the content server 120 via the network 140.

The content server 120 is a computer system used to serve digital content, such as digitized printed publications, audio, or video, to the client 110. The content server 120 stores, or has access to, the digital content, and in response to a user request for a unit of content provides to the client 110 a version of the unit of content that is encrypted according to the user's identity. The content server 120 further provides the client 110 with browser-executable code, such as code written in a browser scripting language such as JAVASCRIPT, used to decrypt the unit of content and to present it within the browser to the user. The content server 120 also modifies the code according to the user's identity, such as by using a code obfuscation algorithm and providing the user identity as a parameter to the algorithm.

The network 140 represents the communication pathways between the clients 110 and the content server 120. In one embodiment, the network 140 uses standard Internet communications technologies and/or protocols. Thus, the network 140 can include links using technologies such as Ethernet, 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Figure 2:
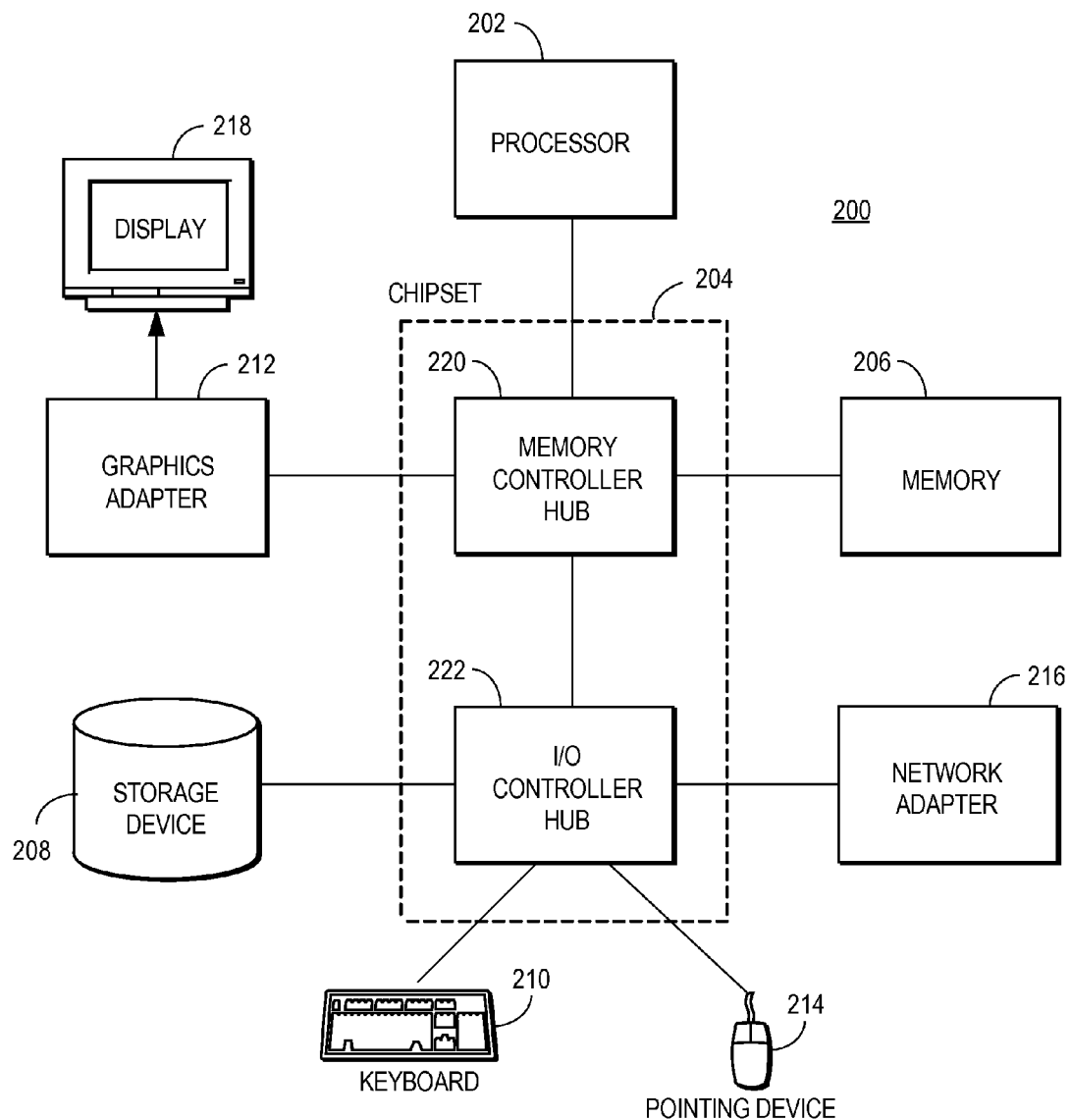
FIG. 2 is a high-level block diagram illustrating an example of a computer for use in the computing environment shown in FIG. 1, according to one embodiment.

The entities shown in FIG. 1 are implemented using one or more computers or digital devices, collectively referred to simply as "computers." FIG. 2 is a high-level block diagram illustrating an example of a computer 200, such as a client 110 or content server 120, for use in the computing environment shown in FIG. 1, according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a server may lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
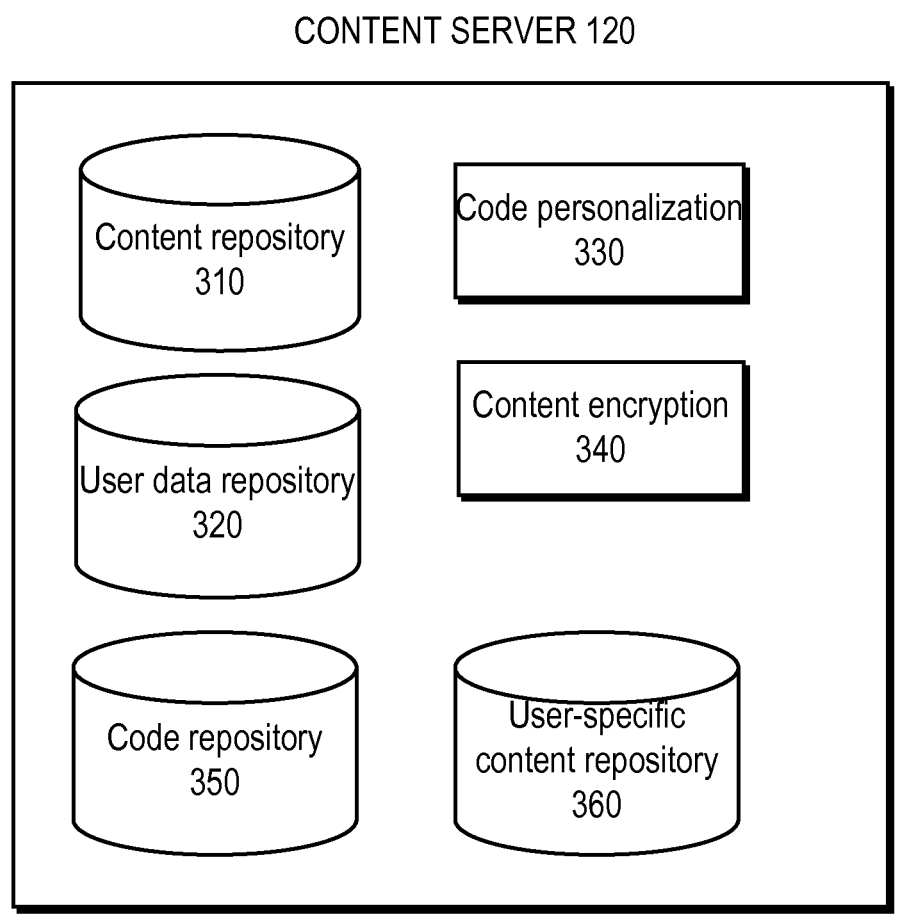
FIG. 3 is a high-level block diagram illustrating modules within a content server, according to one embodiment.

FIG. 3 is a high-level block diagram illustrating modules within the content server 120, according to one embodiment. The content server 120 includes a content repository 310, a user data repository 320, a code repository 350, a code personalization module 330, a content encryption module 340, and a user-specific code repository 360.

The content repository 310 stores the various items of content, such as digital publications (e.g. books, magazines, newspapers, etc.), audio, and video, that are requested by, and provided to, the various clients 110. In one embodiment, the content repository 310 stores only one type of content (e.g., printed publications); in other embodiments, it contains a plurality of types of content (e.g., both printed publications and video). In one embodiment, a given item of content, such as a particular digitized book, is stored so that the particular units requested by a user may easily be retrieved. For example, a digitized book can be stored as a set of individual pages, either as separate files, or as a single file for which the starting locations of individual pages are noted, either in an internal index within the file, or within a global index associated with multiple files. Although the content repository 310 is depicted in FIG. 3 as being located on the content server 120, it could equally be located on a different computer accessible to the content server, or it could be partitioned across multiple computers, such as multiple content servers.

The user data repository 320 stores data pertaining to the various users who have previously registered to be provided content by the content server 120. For example, in one embodiment the user data repository stores a unique identifier for each user of the system, and with it associates information about the user such as the user's username and password, an encryption key for encrypting content for that user, and a decryption key for decrypting the encrypted content (i.e., the inverse of the encryption key). The encryption and decryption keys can be distinct public and private keys of a public key cryptographic system, and/or they can be implemented with a single secret key of a symmetric key cryptographic system.

The code repository 350 stores base (i.e., not yet modified) browser-executable code, such as JAVASCRIPT code, that has the functionality to decrypt and display encrypted content provided by the content server 120 to a client 110. Before the base browser-executable code is provided to a user, it is first modified to be specific to that user, as described below. Additionally, the base browser-executable code is altered at periodic intervals, such as once per week, to increase the difficulty of writing a malicious general-purpose tool that extracts data from the browser-executable code for an arbitrary user. One example is to alter the method signatures (e.g., method names and number, order, and types of the method parameters) of the code. For example, the method names or number of parameters can be altered by someone with access to the content server 120, such as an administrator, programmer, or other employee of the organization operating the content server 120. Such modifications are not difficult to make, yet thwart the attempts of downloading programs that attempt to copy browser-viewed content by making calls to the browser-executable code to decrypt provided content, since the expected browser-executable code API has effectively been altered. Other alterations that can alternatively and/or additionally be employed include reorganizing the code, adding new code, deleting existing code, or changing the obfuscation algorithm. Such alterations can be automated, so that they can be performed automatically on a scheduled basis.

The code personalization module 330 transforms the base browser-executable code from the code repository 350 into a form personalized for a particular user. The base browser-executable code is personalized to the particular user by first inserting, into a known location of the base browser code, the decryption key from the user data repository 320 that corresponds to the identity of the user. For example, the known location could be the value of a variable of a known name. The code is further personalized to the user by then passing to an obfuscation algorithm—such as that of an available tool such as the Closure Compiler utility for JAVASCRIPT provided by GOOGLE, or a custom algorithm—the resulting code, which obfuscates the code based on the user identity.

Code obfuscation may be performed in different ways in different embodiments, and results in an obfuscated version of the browser-executable code that remains functionally equivalent to the base browser-executable code, in that it performs the same operations despite the change in the form of the code. However, the obfuscation makes it more difficult for an attacker to formulate a general technique for extracting useful data—such as the decryption key—from the code. For example, in one embodiment application of the obfuscation algorithm results in renaming of the lexical code units, such as function and variable names, thereby also altering the size of the code, but the code still performs equivalent actions. In another embodiment, the obfuscation encodes the decryption key as a series of expressions, each expression evaluating to a Boolean value. For example, the first bit of the key could be specified using code expression "key[0]=(1>5);", the second bit with expression "key[1]=(4/2==5, 3.7>3.6)", and so forth. Such expressions can be made arbitrarily complex. The various expressions can be chosen based on the user identity rather than being fixed, e.g. by selecting an expression from some set of expressions based on the user identity. Thus, for example, for one user, key[0] could be the result of the expression (1>5), as above; for another user, it could be result of the expression (1.2>=2.5 && 6<2). Such a technique would require an attacker to execute the code and evaluate each expression, rather than simply searching the code for a sequence of values of the expected key length. In another embodiment, the decryption key could be obfuscated as a series of lookup tables by using a white-box decryption algorithm, such as white-box Advanced Encryption Standard (AES). However, these lookup tables could be extracted. Therefore, each round of the white-box decryption algorithm could be implemented as a separate function and a corresponding set of lookup tables. The correspondences between functions and rounds could be obfuscated by code such as the following:

```
var decrypt=function(input, decoyInput) {
  var a=round1(input);
  var b=(23.4>23.5 ? a : decoyInput);
  var c=("hello".length==5 ? a : decoyInput);
  var d=round5(b);
  var e=round2(c);
  var f=(6/2==1 ? e : d);
  var f=round3(f);
  var f=round4(f);
  var g=(5% 2==0 ? f : e);
  var h=(5% 2==1 ? f : e);
  var i=round2(g);
  var j=round5(h);
  . . .
  var x=(1>2 ? v : w);
  return round10(x);
};
```

In the above example, it is assumed that the names 'round1', 'round2', etc. will be changed by the obfuscation algorithm so that the correspondence between functions and rounds is not apparent based on the names of the functions. As above, each expression can be selected based on the user identity. In one embodiment, these obfuscation techniques can be combined, such as by representing the key using the series of Boolean-producing expressions, and then using a utility such as Closure Compiler to rename the lexical code units.

Although the insertion of the user-specific decryption key and the code obfuscation are described above as two separate and distinct steps, it is appreciated that they could also be accomplished together. For example, rather than placing the literal value of the key into the base browser-executable code and then altering the code to represent the key as a series of expressions that evaluate to Boolean values, the series of expressions could first be determined and then inserted into the code in a location associated with the key.

The content encryption module 340 encrypts a given unit of content according to the identity of the requesting user. Specifically, the content encryption module 340 obtains an encryption key corresponding to the user's identity from the user data repository 320, retrieves unit of content from the content repository 310, and encrypts the unit using the encryption key.

In some embodiments, the content server 120 includes user-specific content repository 360, which stores the obfuscated forms of the base browser-executable code and/or encrypted units of content. This allows the obfuscation and/or encryption to be performed in a pre-computation phase, before the associated user has made a request for content, and the results retrieved from the user-specific content repository 360 at runtime. Thus, the computation of the obfuscated form is not responsive to receipt of a user request for content, but rather is independent of it and prior to it. This pre-computation results in improved runtime performance. In one embodiment, in order to reduce required storage space, some users are assigned the same version of obfuscated code. For example, some fixed number of obfuscated versions, such as 1000, can be computed, with users being assigned one of the versions based on their identities, e.g., a user being assigned one of the obfuscated versions having an index corresponding to the user ID modulo 1000. This makes it highly unlikely that a given two users will share the same obfuscated version, without requiring every user to have his or her own version.

Figure 4:
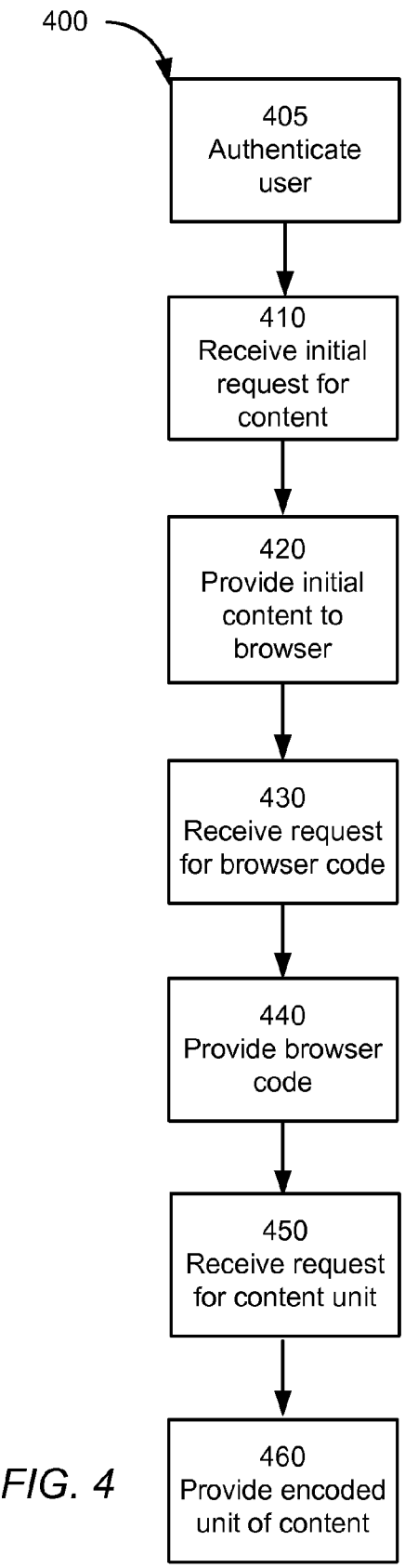
FIG. 4 is a flow diagram that illustrates the actions taken by the content server when providing content to a client, according to one embodiment.

FIG. 4 is a flow diagram that illustrates the actions taken by the content server 120 when providing content to a client 110, according to one embodiment. Preliminarily, the content server 120 authenticates 405 the user to establish the identity of the user and the content to which the user has access. In one embodiment, this is accomplished through a conventional login page, in which the user provides his or her username and password, or equivalent login information, to the content server 120. Upon receipt of valid login information, the content server 120 identifies the user (e.g., determines, and associates with a communication session, a user ID corresponding to the provided login information). The content server 120 also determines the items of content to which the user has access, such as previously purchased items. The content server 120 can also determine encryption information associated the user, e.g., by examining the user data repository 320 to find a key associated with the user's identity.

The content server 120 then receives 410 an initial request for content from the browser 112 of a client 110, such as a first request to view a particular book. Such a request might be triggered, for example, by the user clicking on a thumbnail image of one of the books to which he or she has access.

If the user does in fact have access to the requested item of content, the content server 120 then provides 420 initial content to the client 110, the initial content including additional information related to the content, such as HTML code. For example, in the case of book content, the additional information could include HTML layout code for positioning and displaying the individual pages of the book content, including general information such as the book title and author. Further, the additional information includes a reference to external browser-executable code used to decrypt and display the encrypted content. In one embodiment, the reference is a <script> tag within the provided HTML that references external script content, such as JAVASCRIPT.

Since the browser-executable code is external, separate from the provided HTML page used to display the content, upon parsing the HTML the browser 112 on the client 110 automatically requests the browser-executable code from the content server 120. The content server 120 then receives 430 the request and provides 440 the base browser-executable code from the code repository 350 in a user-specific form modified according to the user. Thus, the code is provided by the content server 120 without an explicit request for it from the user. In one embodiment, for example, the content server 120 inserts a decryption key for decrypting the encrypted content provided in step 420, e.g. as a data variable within the code. This decryption key corresponds to the user-specific encryption key, and is therefore likewise user-specific.

The content server 120 then obfuscates the browser-executable code using a code obfuscation algorithm, passing the identity of the user to the algorithm as a parameter. In an embodiment that precomputes the user-specific browser code, the above operations can be performed during a pre-computation phase, and the result merely read from the user-specific content repository 360 in response to the client request for browser code. Some code obfuscation techniques, such as those of the Closure Compiler algorithm, result in renaming of the lexical code units such as function and variable names. This means that both the name of the variable associated with the key, and the size of the browser-executable code (and thus the location of the decryption key within the code) vary between different users, making it more difficult to extract the decryption key without executing the browser code. More generally, the use of obfuscation vastly increases the difficulty of writing a general purpose tool to circumvent content protections and decrypt content for an arbitrary user.

When the browser 112 receives this obfuscated browser code, it then executes it, the execution causing extraction of the decryption key from the body of the code. For example, execution of the code key[0]=(1>5); from the above example would cause the first bit of the key to be set to the value 0, since the expression 1>5 is false.

With the browser-executable code obtained, the content server 120 at some later point receives 450 a request for a unit of content from the client 110. For example, the client 110 could request a particular page of a digital image of a printed document such as book, e.g., in response to the user using the browser 112 to scroll the image of the document to a page not yet obtained by the client. The request includes an identifier of the user making the request (such as the user ID determined during authentication), an optional signature indicating that the request was issued by the browser-executable code received from the content server 120, and an identifier of the item of content and unit thereof. In one embodiment, the signature is the requested URL, encrypted with the decryption key extracted from the browser-executable code. In one embodiment, the request is made via the browser-executable code using an object such as one of type XMLHTTPRequest, which allows dynamic updating of an existing web page with content. The specific request can be specified with a URL query string, such as ?userID=w83kss89z2&sig=9DFF28BBA& contentID=eWhWAAAAMAAJ&page=72.

In embodiments in which a signature is employed, the content server 120 verifies that the signature corresponds to the user's browser-executable code by examining the user data repository 320 (e.g., by encrypting the requested URL with the decryption key and determining whether it matches the signature accompanying the request), thereby ensuring that the request for content originates from the browser-executable code, as opposed to a malicious tool. If the signature is correct, then the content server 120 provides 460 the requested unit of content. Before providing the unit of content, the content server 120 first encrypts the content in accordance with the user's identity, e.g., by using an encryption key from the user data repository 320 that is associated with the user's identity. The encrypted content is then provided to the client 110. The client 110 may then immediately perform the below-described steps to obtain the decrypted content. Alternatively and/or additionally, it may store the encrypted content and the browser-executable code offline (e.g., cached locally on the client) and perform the below steps at some later point in time.

The received browser-executable code of the browser 112 then applies the previously-extracted decryption key to decrypt the encrypted content, and displays the decrypted content within the browser 112. Since the content is encrypted, and decrypted only at time of display within the browser 112, reading the browser cache will not enable obtaining of the actual content in the absence of the browser-executable code.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer-implemented method of preventing unauthorized redistribution of content provided to a browser of a client device, comprising:
    receiving a request for content from a user, the request including an identifier of the user;
    generating an obfuscated version of browser-executable code stored in a code repository, the generating of the obfuscated version based at least in part on the identifier, the obfuscated version being functionally equivalent to the browser-executable code;
    encrypting the content based at least in part on the identifier;
    providing to the browser a web page configured to display the content and having a reference to the browser-executable code;
    providing the obfuscated version of the browser-executable code and the encrypted content to the browser of the client device, wherein the obfuscated version of the browser-executable code is provided responsive to parsing of the web page by the browser and without receiving an explicit request from the user for the browser-executable code, and wherein the browser-executable code, when executed in the browser, causes decryption of the encrypted content and display of the content within the browser.

2. The computer-implemented method of claim 1, further comprising:
    altering the browser-executable code at a periodic time interval;
    storing the altered browser-executable code in the code repository; and
    generating an obfuscated version of the altered browser-executable code.

3. The computer-implemented method of claim 2, wherein altering the browser-executable code comprises at least one of altering a method name of method parameters of the browser-executable code, altering a number of method parameters of the browser-executable code, reordering the browser-executable code, reorganizing the browser-executable code, adding code to the browser-executable code, deleting code from the browser-executable code, and changing an algorithm used to generate the obfuscated version of the browser-executable code.

4. The computer-implemented method of claim 1, further comprising inserting a decryption key into the browser-executable code prior to the generating of the obfuscated version, the decryption key being associated with the identifier of the user and being the inverse of an encryption key used to perform the encrypting of the content.

5. The computer-implemented method of claim 4, wherein the generating of the obfuscated version of the browser-executable code comprises encoding the decryption key as a series of expressions evaluating to boolean values.

6. The computer-implemented method of claim 5, wherein the expressions are selected based at least in part on the identifier of the user.

7. The computer-implemented method of claim 1, wherein the generating of the obfuscated version is independent of, and prior to, the receiving of the request for content.

8. The computer-implemented method of claim 1, wherein the generating of the obfuscated version of the browser-executable code comprises renaming lexical code units of the browser-executable code.

9. A non-transitory computer-readable storage medium having executable computer program instructions embodied therein for preventing unauthorized redistribution of content provided to a browser of a client device, actions of the computer program instructions comprising:
  receiving a request for content from a user, the request including an identifier of the user;
  generating an obfuscated version of browser-executable code stored in a code repository, the generating of the obfuscated version based at least in part on the identifier, the obfuscated version being functionally equivalent to the browser-executable code;
  encrypting the content based at least in part on the identifier;
  providing to the browser a web page configured to display the content and having a reference to the browser-executable code; and
  providing the obfuscated version of the browser-executable code and the encrypted content to the browser of the client device, wherein the obfuscated version of the browser-executable code is provided responsive to parsing of the web page by the browser and without receiving an explicit request from the user for the browser-executable code, and wherein the browser-executable code, when executed in the browser, causes decryption of the encrypted content and display of the content within the browser.

10. The non-transitory computer-readable storage medium of claim 9, the actions of the computer program instructions further comprising:
  altering the browser-executable code at a periodic time interval;
  storing the altered browser-executable code in the code repository; and
  generating an obfuscated version of the altered browser-executable code.

11. The non-transitory computer-implemented method of claim 10, wherein altering the browser-executable code comprises at least one of altering a method name and altering a number of method parameters of the browser-executable code.

12. The non-transitory computer-readable storage medium of claim 9, the actions of the computer program instructions further comprising inserting a decryption key into the browser-executable code prior to the generating of the obfuscated version, the decryption key being associated with the identifier of the user and being the inverse of an encryption key used to perform the encrypting of the content.

13. The non-transitory computer-readable storage medium of claim 9, wherein the generating of the obfuscated version is independent of, and prior to, the receiving of the request for content.

14. A computer system for preventing unauthorized redistribution of content provided to a browser of a client device, comprising:
  a computer processor;
  a code repository stored on a non-transitory computer-readable storage medium, the code repository storing browser-executable code; and
  a computer program executable by the computer processor and performing actions comprising:
    receiving a request for content from a user, the request including an identifier of the user;
    generating an obfuscated version of the browser-executable code stored in the code repository, the generating of the obfuscated version based at least in part on the identifier, the obfuscated version being functionally equivalent to the browser-executable code;
    encrypting the content based at least in part on the identifier;
    providing to the browser a web page configured to display the content and having a reference to the browser-executable code; and
    providing the obfuscated version of the browser-executable code and the encrypted content to the browser of the client device, wherein the obfuscated version of the browser-executable code is provided responsive to parsing of the web page by the browser and without receiving an explicit request from the user for the browser-executable code;
  wherein the browser-executable code, when executed in the browser, causes decryption of the encrypted content and display of the content within the browser.

15. The computer system of claim 14, the actions of the computer program further comprising:
  altering the browser-executable code at a periodic time interval;
  storing the altered browser-executable code in the code repository; and
  generating an obfuscated version of the altered browser-executable code.

16. The computer system of claim 15, wherein altering the browser-executable code comprises at least one of altering a method name and altering a number of method parameters of the browser-executable code.

17. The computer system of claim 14, the actions of the computer program further comprising inserting a decryption key into the browser-executable code prior to the generating of the obfuscated version, the decryption key being associated with the identifier of the user and being the inverse of an encryption key used to perform the encrypting of the content.

18. The computer system of claim 17, wherein the generating of the obfuscated version of the browser-executable code comprises encoding the decryption key as a series of expressions evaluating to boolean values.

19. The computer system of claim 18, wherein the expressions are selected based at least in part on the identifier of the user.

20. The computer system of claim 14, wherein the generating of the obfuscated version is independent of, and prior to, the receiving of the request for content.

21. The computer system of claim 14, wherein the generating of the obfuscated version of the browser-executable code comprises renaming lexical code units of the browser-executable code.

* * * * *